US010225798B2

(12) United States Patent
Lee et al.

(10) Patent No.: US 10,225,798 B2
(45) Date of Patent: Mar. 5, 2019

(54) TECHNIQUES AND APPARATUSES FOR POWER EFFICIENT ALIGNMENT OF CDRX AND SC-PTM DRX SCHEDULES

(71) Applicant: QUALCOMM Incorporated, San Diego, CA (US)

(72) Inventors: Kuo-Chun Lee, San Diego, CA (US); Sivaramakrishna Veerepalli, San Diego, CA (US); Shailesh Maheshwari, San Diego, CA (US); Rahul Kashyap, San Diego, CA (US); Muhammad Usman Aulakh, San Diego, CA (US); Mahesh Kommi, San Diego, CA (US); Omar Sabbarini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 15/376,280

(22) Filed: Dec. 12, 2016

(65) Prior Publication Data

US 2018/0167881 A1 Jun. 14, 2018

(51) Int. Cl.
*H04W 52/02* (2009.01)
*H04W 76/28* (2018.01)
*H04L 12/18* (2006.01)

(52) U.S. Cl.
CPC ... *H04W 52/0216* (2013.01); *H04W 52/0206* (2013.01); *H04W 76/28* (2018.02); *H04L 12/189* (2013.01)

(58) Field of Classification Search
CPC ....... H04W 4/06; H04W 72/04; H04W 28/06; H04W 48/18
See application file for complete search history.

(56) References Cited

U.S. PATENT DOCUMENTS

| 9,232,555 B2 | 1/2016 | Su |
| 9,445,365 B2 | 9/2016 | Makharia et al. |
| 2004/0029596 A1 | 2/2004 | Kim et al. |
| 2014/0119265 A1 | 5/2014 | Shauh et al. |
| 2015/0003355 A1* | 1/2015 | Dalsgaard ......... H04W 72/0413 370/329 |
| 2015/0296391 A1 | 10/2015 | Kotkar et al. |

(Continued)

FOREIGN PATENT DOCUMENTS

| WO | WO-2016011661 A1 | 1/2016 |
| WO | 2016119212 A1 | 8/2016 |
| WO | 2016121786 A1 | 8/2016 |

OTHER PUBLICATIONS

International Search Report and Written Opinion—PCT/US2017/057616—ISA/EPO—Feb. 15, 2018.

*Primary Examiner* — Chi Ho A Lee
(74) *Attorney, Agent, or Firm* — Anthony R. Morris

(57) ABSTRACT

A method, an apparatus, and a computer program product for wireless communication are provided. The apparatus may receive a temporary mobile group identifier (TMGI) for a single cell point-to-multipoint (SC-PTM) service to which a user equipment (UE) is to be subscribed. The apparatus may configure a connected mode discontinuous reception (CDRX) schedule for the UE based at least in part on an SC-PTM discontinuous reception (DRX) schedule that corresponds to the TMGI. The apparatus may transmit the CDRX schedule to the UE.

30 Claims, 16 Drawing Sheets

(56) References Cited

U.S. PATENT DOCUMENTS

| | | | |
|---|---|---|---|
| 2015/0305056 A1* | 10/2015 | Vangala | H04W 72/1242 |
| | | | 455/450 |
| 2016/0262178 A1* | 9/2016 | Vangala | H04W 72/14 |
| 2016/0302224 A1* | 10/2016 | Khairmode | H04L 5/0055 |
| 2016/0366641 A1* | 12/2016 | Makharia | H04W 52/0216 |
| 2017/0202053 A1* | 7/2017 | Rune | H04W 76/048 |
| 2017/0332213 A1* | 11/2017 | Xu | H04L 5/0035 |
| 2017/0339723 A1 | 11/2017 | Fujishiro et al. | |
| 2017/0366363 A1* | 12/2017 | Hong | H04L 12/189 |
| 2018/0014246 A1* | 1/2018 | Chang | H04W 48/18 |
| 2018/0027528 A1* | 1/2018 | Hong | H04W 4/08 |
| | | | 370/331 |
| 2018/0042033 A1* | 2/2018 | Xu | H04W 72/121 |
| 2018/0049006 A1* | 2/2018 | Hong | H04W 4/06 |
| 2018/0049060 A1* | 2/2018 | Fujishiro | H04W 28/06 |

* cited by examiner

TECHNIQUES AND APPARATUSES FOR POWER EFFICIENT ALIGNMENT OF CDRX AND SC-PTM DRX SCHEDULES

BACKGROUND

Field

The present disclosure relates generally to communication systems, and more particularly, to techniques and apparatuses for power efficient alignment of CDRX and SC-PTM DRX schedules.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a base station, a user equipment (UE), an apparatus, and a computer program product are provided.

In some aspects, the method may include receiving, by a base station, a temporary mobile group identifier (TMGI) for a single cell point-to-multipoint (SC-PTM) service to which a user equipment (UE) is to be subscribed. The method may include configuring, by the base station, a connected mode discontinuous reception (CDRX) schedule for the UE based at least in part on an SC-PTM discontinuous reception (DRX) schedule that corresponds to the TMGI. The method may include transmitting, by the base station, the CDRX schedule to the UE.

In some aspects, the method may include transmitting, by a user equipment (UE), a temporary mobile group identifier (TMGI) for a single cell point-to-multipoint (SC-PTM) service to which the UE is to be subscribed. The method may include receiving, by the UE, a connected mode discontinuous reception (CDRX) schedule that is configured based at least in part on an SC-PTM discontinuous reception (DRX) schedule that corresponds to the TMGI. The method may include configuring the UE using the CDRX schedule.

In some aspects, the base station may include a memory and at least one processor coupled to the memory and configured to receive a temporary mobile group identifier (TMGI) for a single cell point-to-multipoint (SC-PTM) service to which a user equipment (UE) is to be subscribed. The at least one processor may be configured to configure a connected mode discontinuous reception (CDRX) schedule for the UE based at least in part on an SC-PTM discontinuous reception (DRX) schedule that corresponds to the TMGI. The at least one processor may be configured to transmit the CDRX schedule to the UE.

In some aspects, the UE may include a memory and at least one processor coupled to the memory and configured to transmit a temporary mobile group identifier (TMGI) for a single cell point-to-multipoint (SC-PTM) service to which the UE is to be subscribed. The at least one processor may be configured to receive a connected mode discontinuous reception (CDRX) schedule that is configured based at least in part on an SC-PTM discontinuous reception (DRX) schedule that corresponds to the TMGI. The at least one processor may be configured to configure the UE using the CDRX schedule.

In some aspects, the apparatus may include means for receiving a temporary mobile group identifier (TMGI) for a single cell point-to-multipoint (SC-PTM) service to which a user equipment (UE) is to be subscribed. The apparatus may include means for configuring a connected mode discontinuous reception (CDRX) schedule for the UE based at least in part on an SC-PTM discontinuous reception (DRX) schedule that corresponds to the TMGI. The apparatus may include means for transmitting the CDRX schedule to the UE.

In some aspects, the apparatus may include means for transmitting a temporary mobile group identifier (TMGI) for a single cell point-to-multipoint (SC-PTM) service to which the apparatus is to be subscribed. The apparatus may include means for receiving a connected mode discontinuous reception (CDRX) schedule that is configured based at least in part on an SC-PTM discontinuous reception (DRX) schedule that corresponds to the TMGI. The apparatus may include means for configuring the apparatus using the CDRX schedule.

In some aspects, the computer program product may include a non-transitory computer-readable medium storing computer executable code for wireless communication. The code may include code for receiving a temporary mobile group identifier (TMGI) for a single cell point-to-multipoint (SC-PTM) service to which a user equipment (UE) is to be subscribed. The code may include code for configuring a connected mode discontinuous reception (CDRX) schedule for the UE based at least in part on an SC-PTM discontinuous reception (DRX) schedule that corresponds to the TMGI. The code may include code for transmitting the CDRX schedule to the UE.

In some aspects, the computer program product may include a non-transitory computer-readable medium storing computer executable code for wireless communication. The code may include code for transmitting a temporary mobile group identifier (TMGI) for a single cell point-to-multipoint (SC-PTM) service to which a UE is to be subscribed. The code may include code for receiving a connected mode discontinuous reception (CDRX) schedule that is configured based at least in part on an SC-PTM discontinuous reception (DRX) schedule that corresponds to the TMGI. The code may include code for configuring the UE using the CDRX schedule.

DETAILED DESCRIPTION

Figure 1:
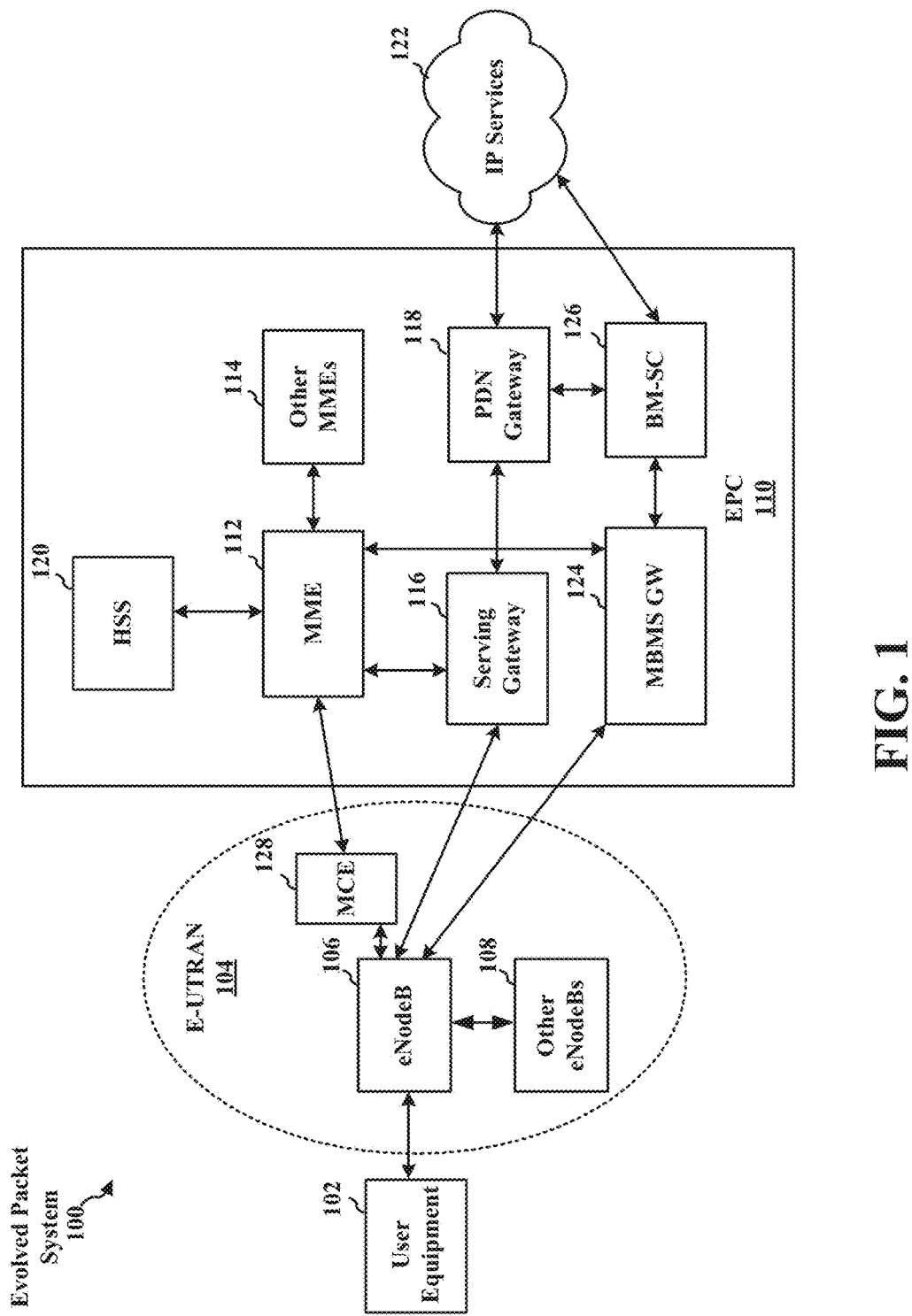
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

FIG. 1 is provided as an example. Other examples are possible and may differ from what was described in connection with FIG. 1.

Figure 2:
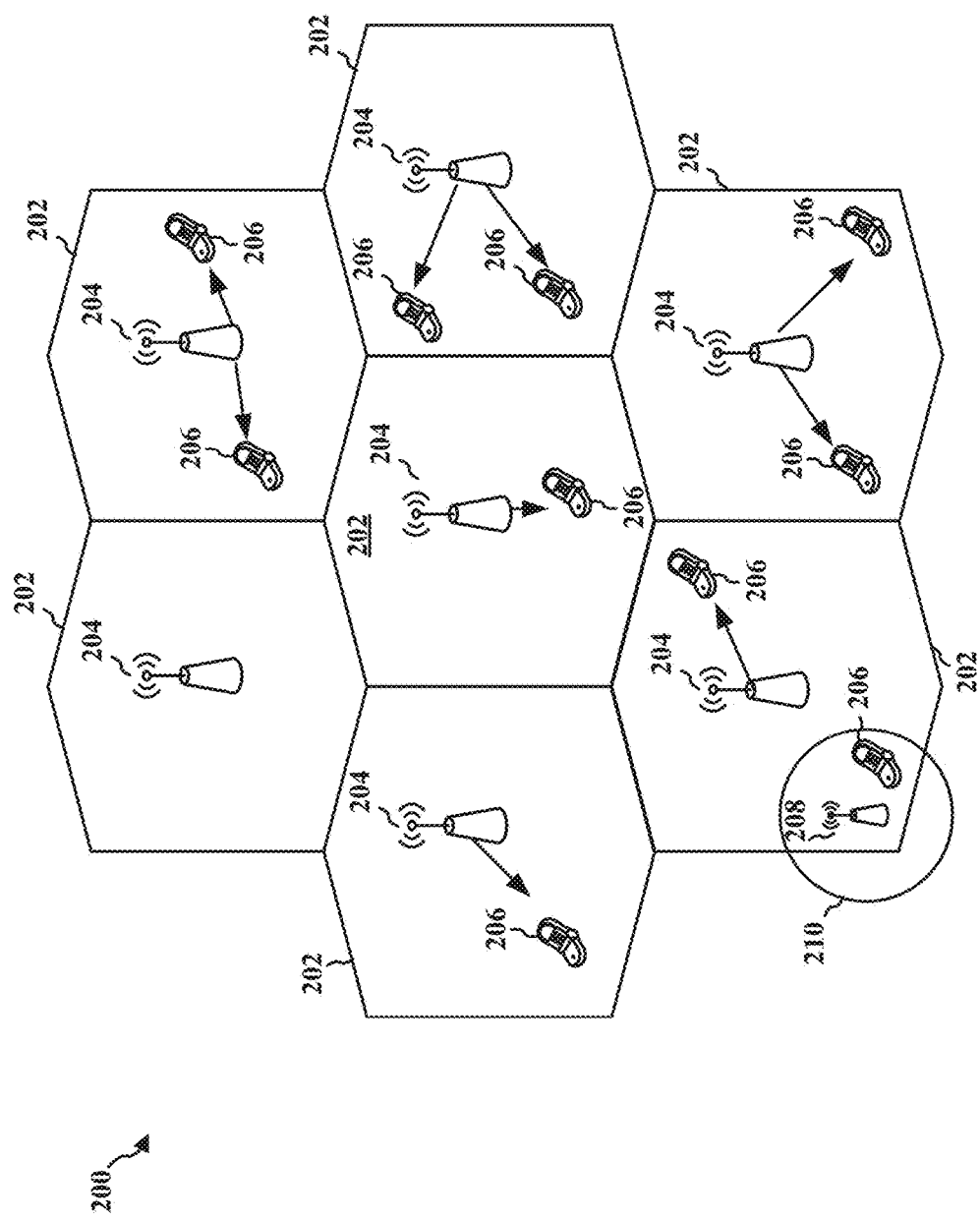
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

FIG. 2 is provided as an example. Other examples are possible and may differ from what was described in connection with FIG. 2.

Figure 3:
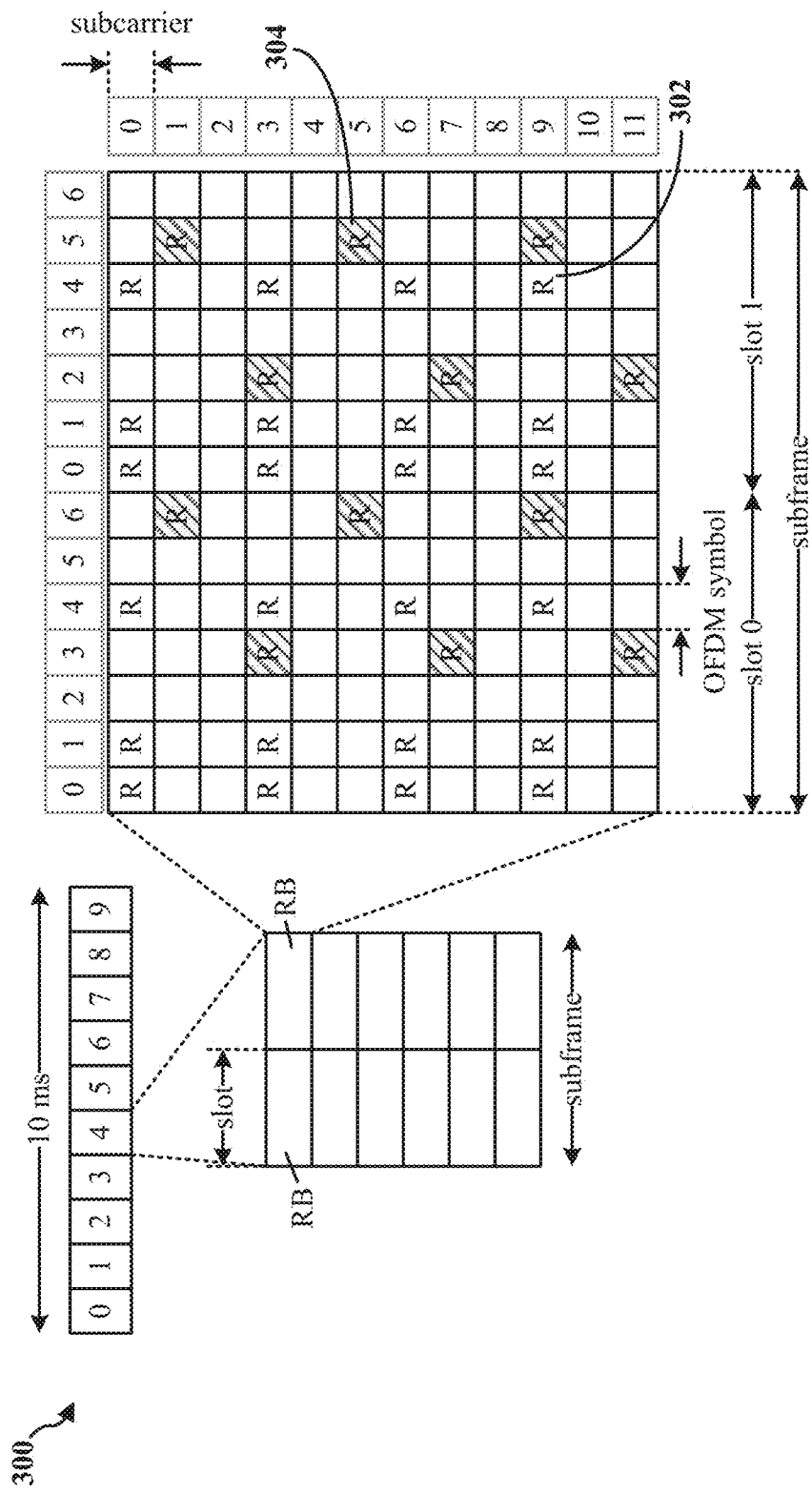
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

FIG. 3 is provided as an example. Other examples are possible and may differ from what was described in connection with FIG. 3.

Figure 4:
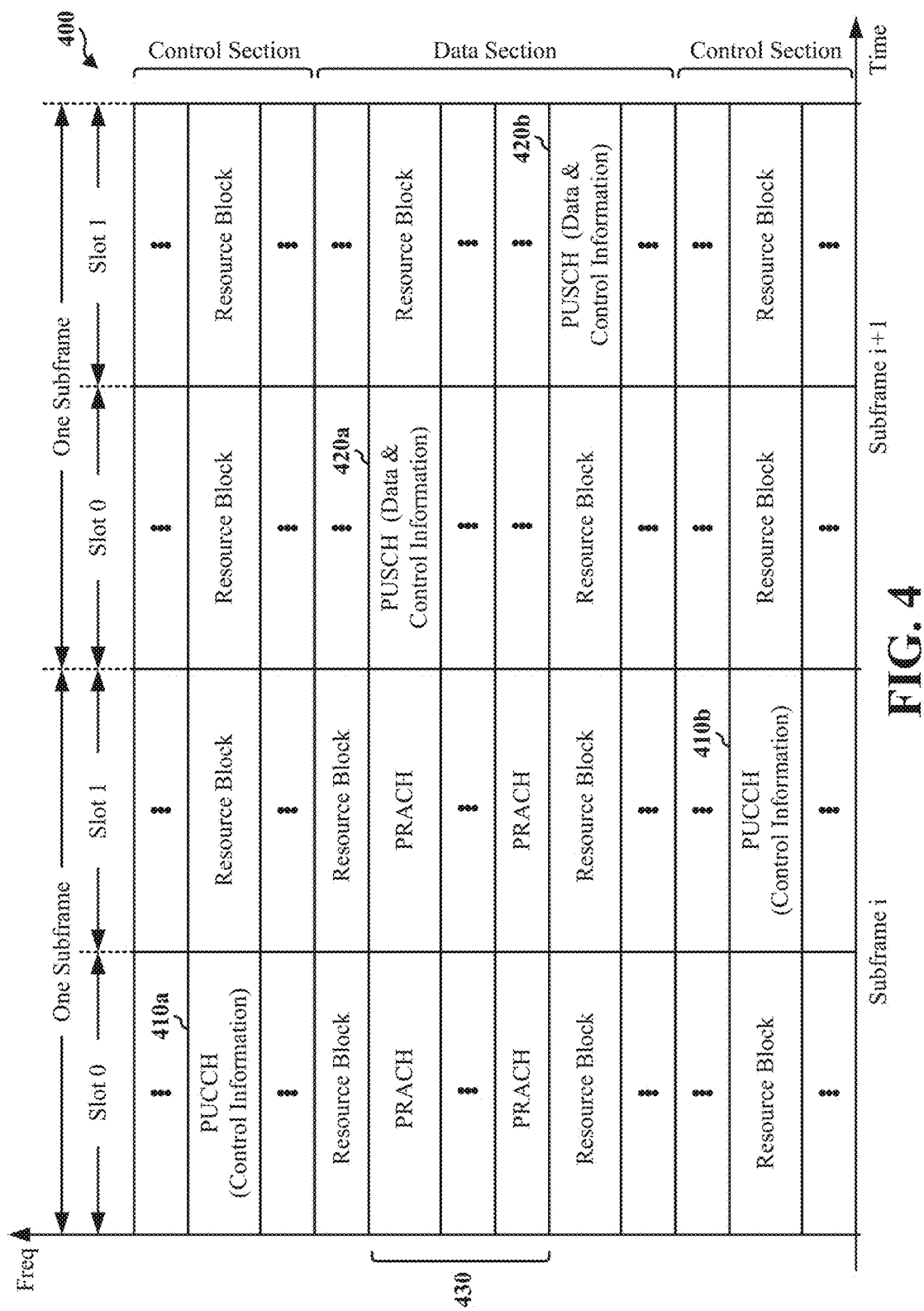
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

FIG. 4 is provided as an example. Other examples are possible and may differ from what was described in connection with FIG. 4.

Figure 5:
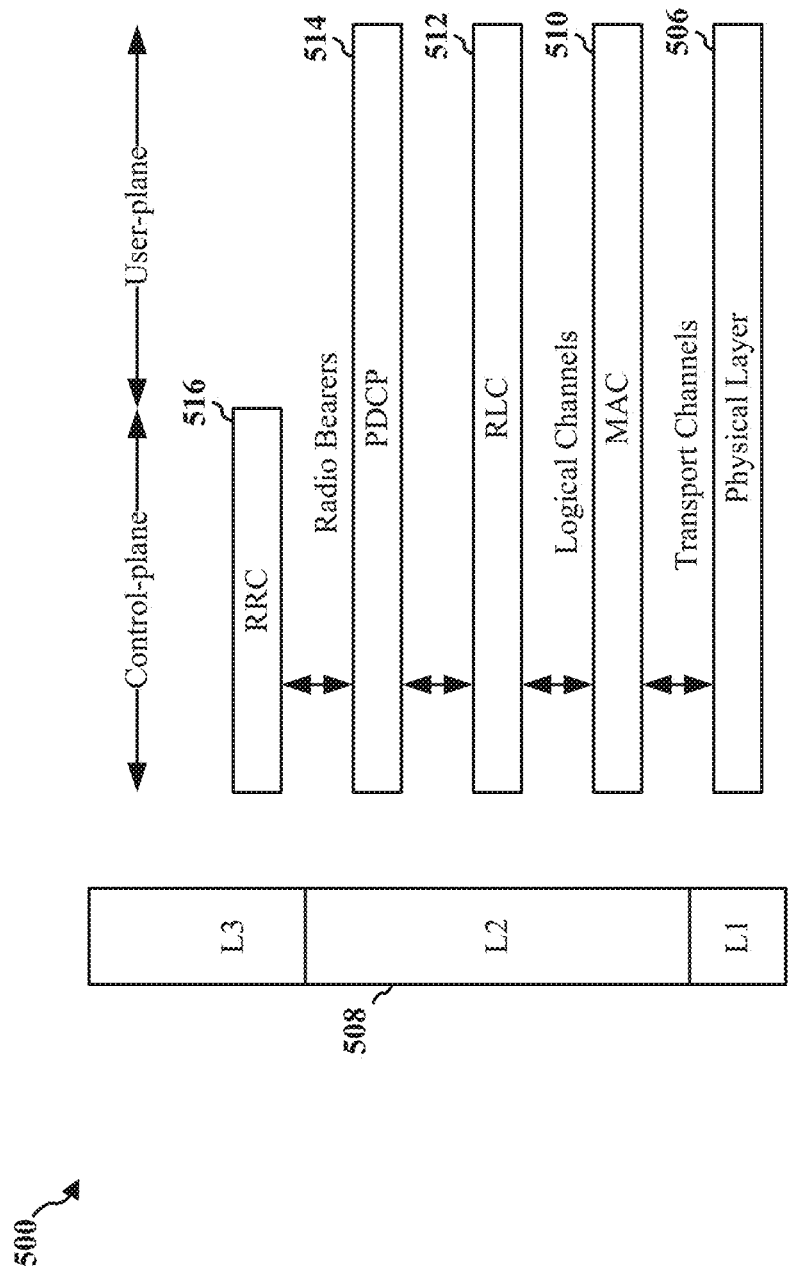
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) sublayer 514, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

FIG. 5 is provided as an example. Other examples are possible and may differ from what was described in connection with FIG. 5.

Figure 6:
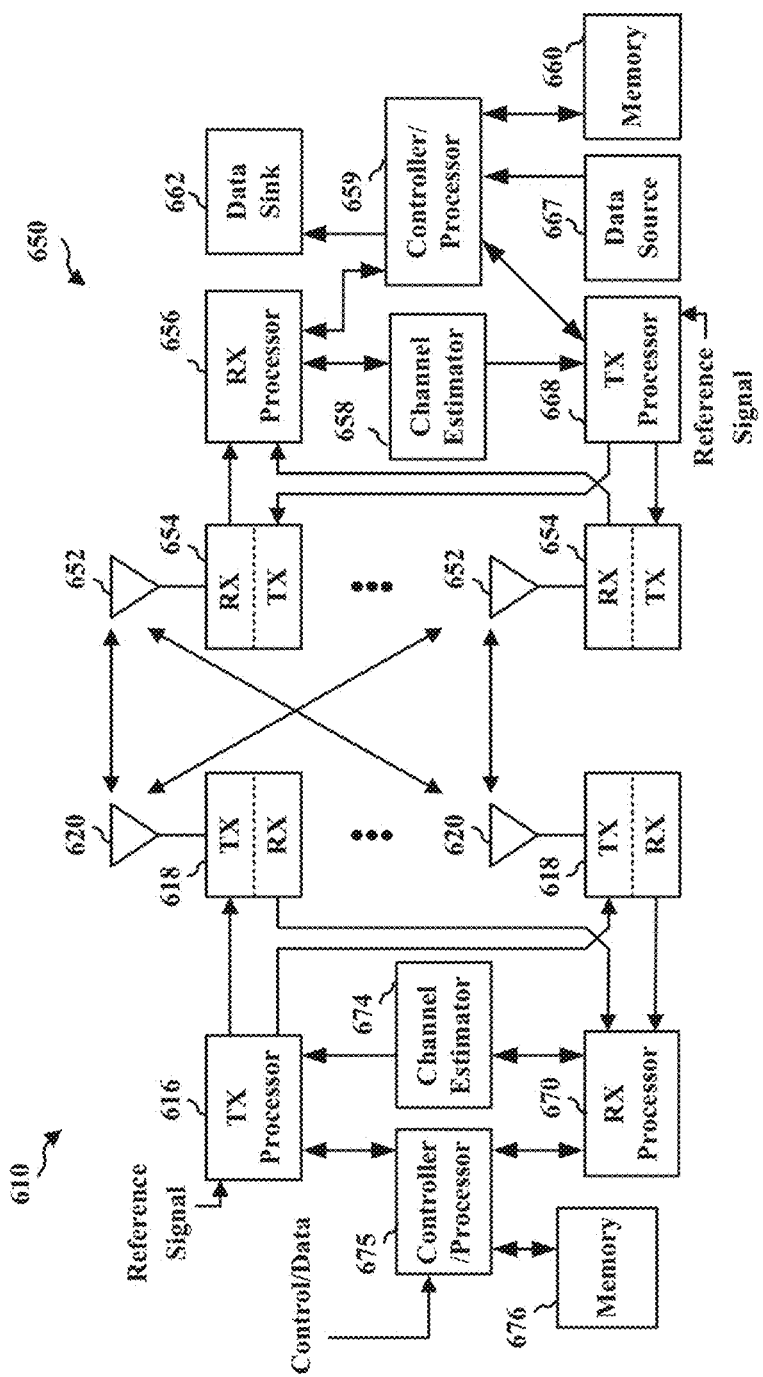
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based at least in part on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based at least in part on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based at least in part on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based at least in part on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIG. 6 is provided as an example. Other examples are possible and may differ from what was described in connection with FIG. 6.

As described in more detail below, a UE (e.g., a UE 102, 206, 650) may subscribe to a single cell point-to-multipoint (SC-PTM) service to receive, for example, evolved multimedia broadcast multicast service (eMBMS) communications. In SC-PTM, eMBMS communications are sent on the PDSCH. Furthermore, in SC-PTM, the PDSCH includes a logical channel for SC-PTM data traffic, referred to as the single cell multicast traffic channel (SC-MTCH), and a logical channel for SC-PTM control information, referred to as the single cell multicast control channel (SC-MCCH). The UE uses a group specific radio network temporary identifier (G-RNTI) and a single cell RNTI (SC-RNTI) to identify downlink grants on the PDCCH for communications on the SC-MTCH and the SC-MCCH, respectively. Furthermore, in SC-PTM, the UE may be configured to use discontinuous reception (DRX) to periodically wake up and monitor for SC-PTM communications (e.g., on the SC-MTCH and/or the SC-MCCH) during an active period (e.g., an on duration), and to enter a sleep mode during an inactive period (e.g., an off duration), thereby conserving battery power. Different SC-PTM services may be associated with different SC-PTM DRX schedules.

When in a connected mode, the UE may be configured to use a connected mode DRX (CDRX) schedule to periodically wake up and monitor the PDCCH during an active period (e.g., an on duration), and to enter a sleep mode during an inactive period, thereby conserving battery power. In some situations, the UE may separately wake up to monitor for communications on the PDCCH and the PDSCH, which may waste battery power and other resources of the UE. For example, the UE may wake up twice to separately monitor the PDCCH (e.g., using the CDRX schedule) and the PDSCH (e.g., using the SC-PTM DRX schedule) during different active periods (e.g., different on durations), rather than waking up once to monitor both the PDCCH and the PDSCH (e.g., the SC-MCCH and/or the SC-MTCH on the PDSCH) during the same active period. Aspects described herein assist with configuring a CDRX schedule using an SC-PTM DRX schedule (e.g., to time-align the schedules), thereby conserving battery power and other resources of the UE.

Figure 7:
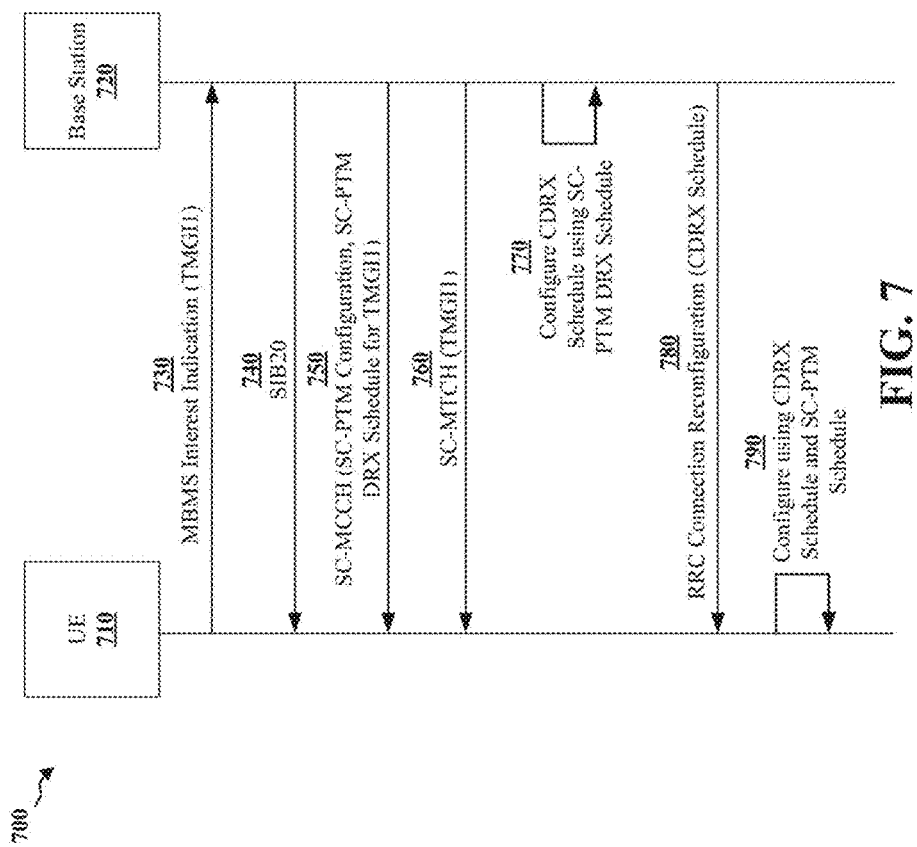
FIGS. 7-10 are diagrams illustrating examples of power efficient alignment of CDRX and SC-PTM DRX schedules.

FIG. 7 is a diagram illustrating an example 700 of power efficient alignment of CDRX and SC-PTM DRX schedules. As shown in FIG. 7, a UE 710 (e.g., which may correspond to one or more of the UE 102 of FIG. 1, the UE 206 of FIG. 2, and/or the UE 650 of FIG. 6) may communicate with a base station 720 (e.g., which may correspond to one or more of the eNBs 106, 108 of FIG. 1, the eNBs 204, 208 of FIG. 2, and/or the eNB 610 of FIG. 6).

As shown by reference number 730, the UE 710 may transmit an MBMS Interest Indication (MII) message to the base station 720. The MII message may include a temporary mobile group identifier (TMGI) that identifies an SC-PTM service to which the UE 710 is to be subscribed. Different SC-PTM services may be identified by different TMGIs, and the UE 710 may use a TMGI to subscribe to a corresponding SC-PTM service, such as by transmitting the MII message that includes the TMGI. For example, the UE 710 may transmit an MII message that includes TMGI1, as shown, to subscribe to an SC-PTM service that corresponds to TMGI1.

As shown by reference number 740, the base station 720 may transmit a system information block type 20 (SIB20) to the UE 710. The SIB20 may include scheduling information that indicates a schedule for the SC-MCCH.

As shown by reference number 750, the UE 710 may acquire the SC-MCCH by monitoring the PDCCH for downlink control information (DCI) messages, sent by the base station 720, using the scheduling information included in SIB20. A DCI message for the SC-MCCH may include a downlink grant for accessing the SC-MCCH on the PDSCH. As further shown, the UE 710 may access the SC-MCCH to obtain SC-PTM configuration information transmitted by the base station 720 (e.g., in an SC-PTM Configuration message). The SC-PTM configuration information may include scheduling information for acquiring the SC-MTCH and accessing one or more SC-PTM services (e.g., one or more or all offered SC-PTM services on the SC-MTCH). For example, the scheduling information may indicate a schedule associated with transmission of the SC-MTCH for the TMGI included in the MII message (e.g., TMGI1).

Additionally, or alternatively, the scheduling information may indicate an SC-PTM DRX schedule for the SC-PTM service associated with the TMGI included in the MII message. The SC-PTM DRX schedule may indicate, for example, a value for an SC-PTM DRX cycle length (e.g., an SC-MTCH-SchedulingCycle parameter), a value for an SC-PTM DRX offset (e.g., an SC-MTCH-SchedulingOffset parameter), a value for an SC-PTM DRX on duration timer (e.g., an onDurationTimerSCPTM parameter), a value for an SC-PTM DRX inactivity timer (e.g., a drx-InactivityTimerSCPTM parameter), and/or the like. The UE 710 may use one or more of these values to configure an SC-PTM DRX active period (e.g., on duration) during which the UE 710 is awake to monitor for communications (e.g., on the SC-MCCH and/or the SC-MTCH of the PDSCH).

As shown by reference number 760, the UE 710 may use the SC-MTCH to receive the SC-PTM service, identified by TMGI1, from the base station 720. For example, different SC-PTM services may be associated with different group specific RNTIs (G-RNTIs). To obtain a specific SC-PTM service, the UE 710 may monitor the PDCCH for DCI messages using a G-RNTI for the specific SC-PTM service and scheduling information for the SC-MTCH. A DCI message for the SC-MTCH may include one or more downlink grants for accessing the SC-PTM service on the SC-MTCH of the PDSCH. The UE 710 may use the downlink grants to receive the SC-PTM service. For example, the UE 710 may receive the SC-PTM service identified by TMGI1 on the SC-MTCH, as shown.

A shown by reference number 770, the base station 720 may configure a CDRX schedule, for the UE 710, using the SC-PTM DRX schedule that corresponds to the TMGI received from the UE 710 in the MII message (e.g., TMGI1, as shown). The CDRX schedule may indicate, for example, a value for a CDRX cycle length (e.g., a drx-Cycle parameter), a value for a CDRX offset (e.g., a drx-StartOffset parameter), a value for a CDRX on duration timer (e.g., an onDuration parameter), a value for a CDRX inactivity timer (e.g., a drx-InactivityTimer parameter), and/or the like. The UE 710 may use one or more of these values to configure a CDRX active period (e.g., on duration) during which the UE 710 is awake to monitor for communications (e.g., on the PDCCH).

In some aspects, the base station 720 may configure the CDRX cycle length to match the SC-PTM DRX cycle length. In some aspects, the base station 720 may configure the CDRX cycle length to be an integer multiple of or an integer divisor of the SC-PTM DRX cycle length. Additionally, or alternatively, the base station 720 may configure the CDRX offset to match the SC-PTM DRX offset. Additionally, or alternatively, the base station 720 may configure the CDRX on duration timer to match the SC-PTM DRX on duration timer. Additionally, or alternatively, the base station 720 may configure the CDRX inactivity timer to match the SC-PTM DRX inactivity timer. The base station 720 may use one or more of these configurations to time-align the CDRX on duration with the SC-PTM DRX on duration, thereby reducing the quantity of times that the UE 710 wakes up, which conserves battery power of the UE 710.

For example, the base station 720 may configure at least one CDRX on duration (e.g., one, multiple, or all CDRX on durations in the CDRX schedule) to completely coincide with at least one SC-PTM DRX on duration (e.g., one, multiple, or all SC-PTM DRX on durations in the SC-PTM DRX schedule). As another example, the base station 720 may configure at least one CDRX on duration to partially coincide with at least one SC-PTM DRX on duration. As another example, the base station 720 may configure at least one CDRX on duration to be contiguous with at least one SC-PTM DRX on duration. As another example, the base station 720 may configure at least one CDRX on duration to occur within a threshold time period of at least one SC-PTM DRX on duration. In this way, the base station 720 may configure the CDRX schedule so as to conserve battery power and other resources of the UE 710.

As shown by reference number 780, the base station 720 may transmit the CDRX schedule to the UE 710. For example, the base station 720 may transmit the CDRX schedule in an RRC connection reconfiguration message. In some aspects, the base station 720 may receive the MII message after an initial CDRX schedule configuration (e.g., performed by the base station 720), may reconfigure the CDRX schedule after the initial CDRX schedule configuration and after receiving the MII message, and may transmit the reconfigured CDRX schedule to the UE 710. In this case, the base station 720 may transmit the reconfigured CDRX schedule in an RRC connection reconfiguration message, as shown. In some aspects, the base station 720 may receive the MII message prior to an initial CDRX schedule configuration, may initially configure the CDRX schedule as part of the initial CDRX schedule configuration after receiving the MII message, and may transmit the initial CDRX schedule to the UE 710. In this case, the base station 720 may transmit the configured CDRX schedule in an RRC connection configuration message (not shown).

As shown by reference number 790, the UE 710 may use the CDRX schedule (e.g., received from the base station 720, as shown by reference number 780) to configure CDRX on the UE 710, and may use the SC-PTM DRX schedule (e.g., received from the base station 720, as shown by reference number 750) to configure SC-PTM DRX on the UE 710. In this way, at least one CDRX on duration for the UE 710 may be time-aligned with at least one SC-PTM DRX on duration for the UE 710, which reduces a quantity of times that the UE 710 wakes up, thereby conserving battery power and other resources of the UE 710.

As indicated above, FIG. 7 is provided as an example. Other examples are possible and may differ from what was described in connection with FIG. 7.

Figure 8:
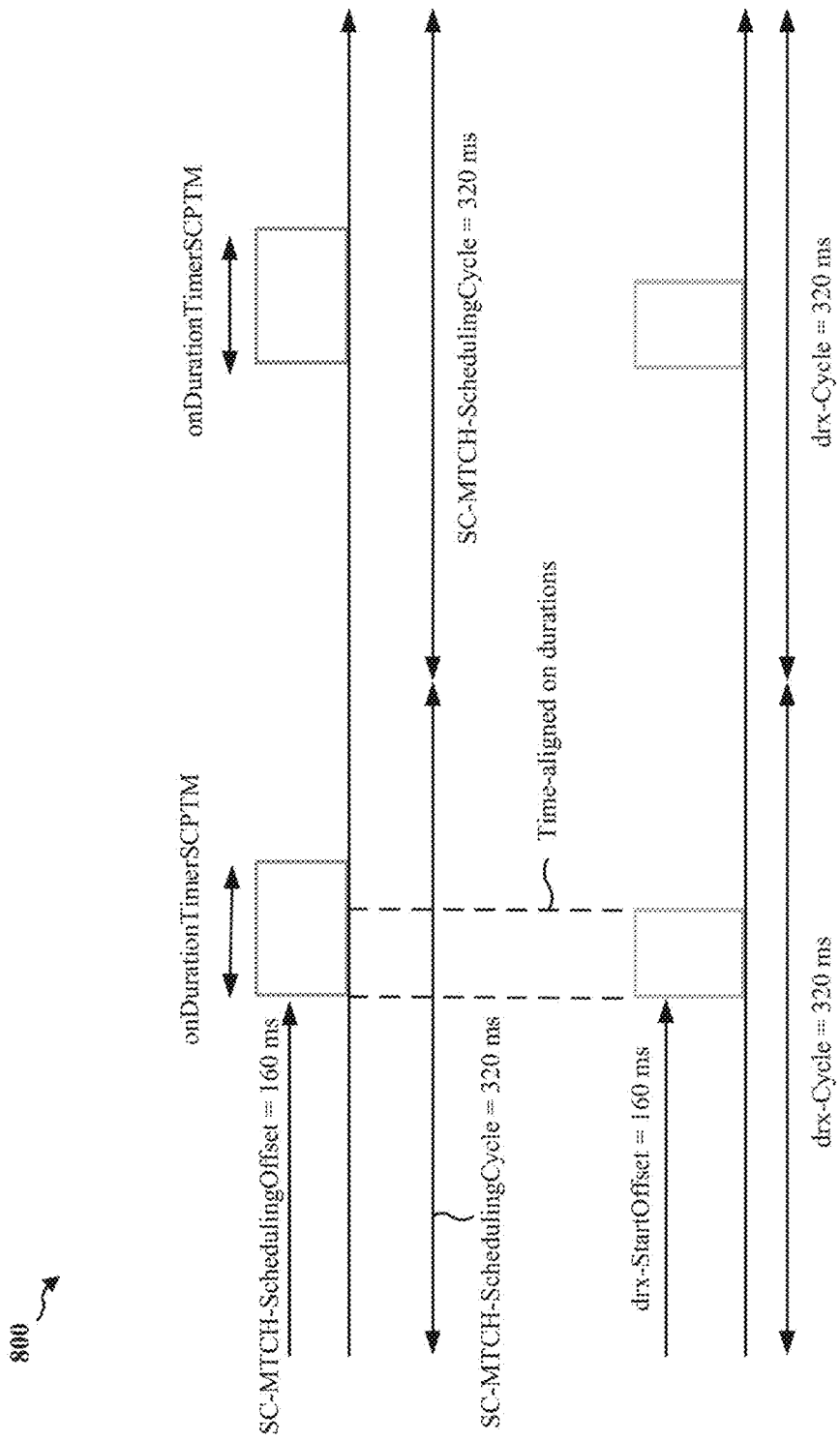

FIG. 8 is a diagram illustrating another example 800 of power efficient alignment of CDRX and SC-PTM DRX schedules. FIG. 8 shows an example of configuring, by a base station, a CDRX schedule using an SC-PTM DRX schedule.

As shown in FIG. 8, an example SC-PTM DRX schedule may have an SC-PTM DRX cycle length of 320 ms (e.g., as shown by SC-MTCH-SchedulingCycle), and may have an SC-PTM DRX offset of 160 ms (e.g., as shown by SC-MTCH-SchedulingOffset). As further shown, in some aspects, the base station may configure a CDRX cycle length of the CDRX schedule to match the SC-PTM DRX cycle length of the SC-PTM DRX schedule. For example, the base station may set the CDRX cycle length equal to 320 ms (e.g., as shown by drx-Cycle). Additionally, or alternatively, and as further shown, the base station may configure a CDRX offset of the CDRX schedule to match the SC-PTM DRX offset of the SC-PTM DRX cycle. For example, the base station may set the CDRX offset equal to 160 ms (e.g., as shown by drx-StartOffset).

By configuring the CDRX cycle length using the SC-PTM cycle length, and/or by configuring the CDRX offset using the SC-PTM offset, the base station configures at least one CDRX on duration to be time-aligned with at least one SC-PTM on duration. In the case where the base station configures the CDRX cycle length to match the SC-PTM DRX cycle length and configures the CDRX offset to match the SC-PTM offset, the base station may time-align all CDRX on durations with all SC-PTM DRX on durations (e.g., by setting a starting boundary of the CDRX on duration and the SC-PTM DRX on duration to occur simultaneously). In this way, a UE may wake up once to monitor for communications associated with both CDRX and SC-PTM DRX, rather than waking up separately, thereby conserving battery power of the UE.

As shown in FIG. 8, the base station may configure a CDRX on duration to completely coincide with an SC-PTM DRX on duration. In this case, the entirety of the CDRX on duration occurs during the SC-PTM on duration. This reduces a length of time that the UE is in an active state as compared to a CDRX on duration that partially overlaps with the SC-PTM on duration, thereby conserving battery power of the UE. However, in some cases, the base station may not be able to configure the CDRX and SC-PTM on durations to completely coincide due to a requirement of the CDRX schedule and/or the SC-PTM schedule. In this case, the base station may configure the CDRX on duration to partially coincide with the SC-PTM on duration, as described in more detail below in connection with FIG. 9.

As another example, in some aspects, the base station may configure the CDRX on duration to be contiguous with the SC-PTM DRX on duration. For example, the base station may configure a starting boundary of the CDRX on duration to occur at the same time as an ending boundary of the SC-PTM DRX on duration, or may configure an ending boundary of the CDRX on duration to occur at the same time as a starting boundary of the SC-PTM DRX on duration. In this way, the base station may conserve battery power of the UE (e.g., by reducing the number of times that the UE wakes up) when the CDRX on duration and the SC-PTM DRX on duration cannot be configured to completely or partially coincide.

As another example, the base station may configure the CDRX on duration to occur within a threshold time period of the SC-PTM DRX on duration. For example, the base station may configure a starting boundary of the CDRX on duration to occur within a threshold time period after an ending boundary of the SC-PTM DRX on duration, or may configure an ending boundary of the CDRX on duration to occur within a threshold time period before a starting boundary of the SC-PTM DRX on duration. In this way, the base station may conserve battery power of the UE (e.g., by reducing the number of times that the UE wakes up) when the CDRX on duration and the SC-PTM DRX on duration cannot be configured to completely coincide, partially coincide, or be contiguous.

Although not shown in FIG. 8, in some aspects, the base station may configure a CDRX on duration timer to match an SC-PTM DRX on duration timer. In this case, if the starting boundaries of the CDRX on duration and the SC-PTM DRX on duration occur at the same time and the CDRX on duration timer and the SC-PTM DRX on duration timer are configured to match, then the ending boundaries of the CDRX on duration and the SC-PTM DRX on duration may also occur at the same time. In this way, when both the CDRX on duration and the SC-PTM DRX on duration completely coincide with one another, the UE may conserve battery power.

Additionally, or alternatively, the base station may configure a CDRX inactivity timer to match an SC-PTM DRX inactivity timer. In this way, the UE may enter a sleep mode for both CDRX and SC-PTM DRX at the same time following a successfully decoded transmission, which conserves battery power as compared to waiting an additional amount of time to enter sleep mode if the inactivity timers do not match.

As indicated above, FIG. 8 is provided as an example. Other examples are possible and may differ from what was described in connection with FIG. 8.

Figure 9:
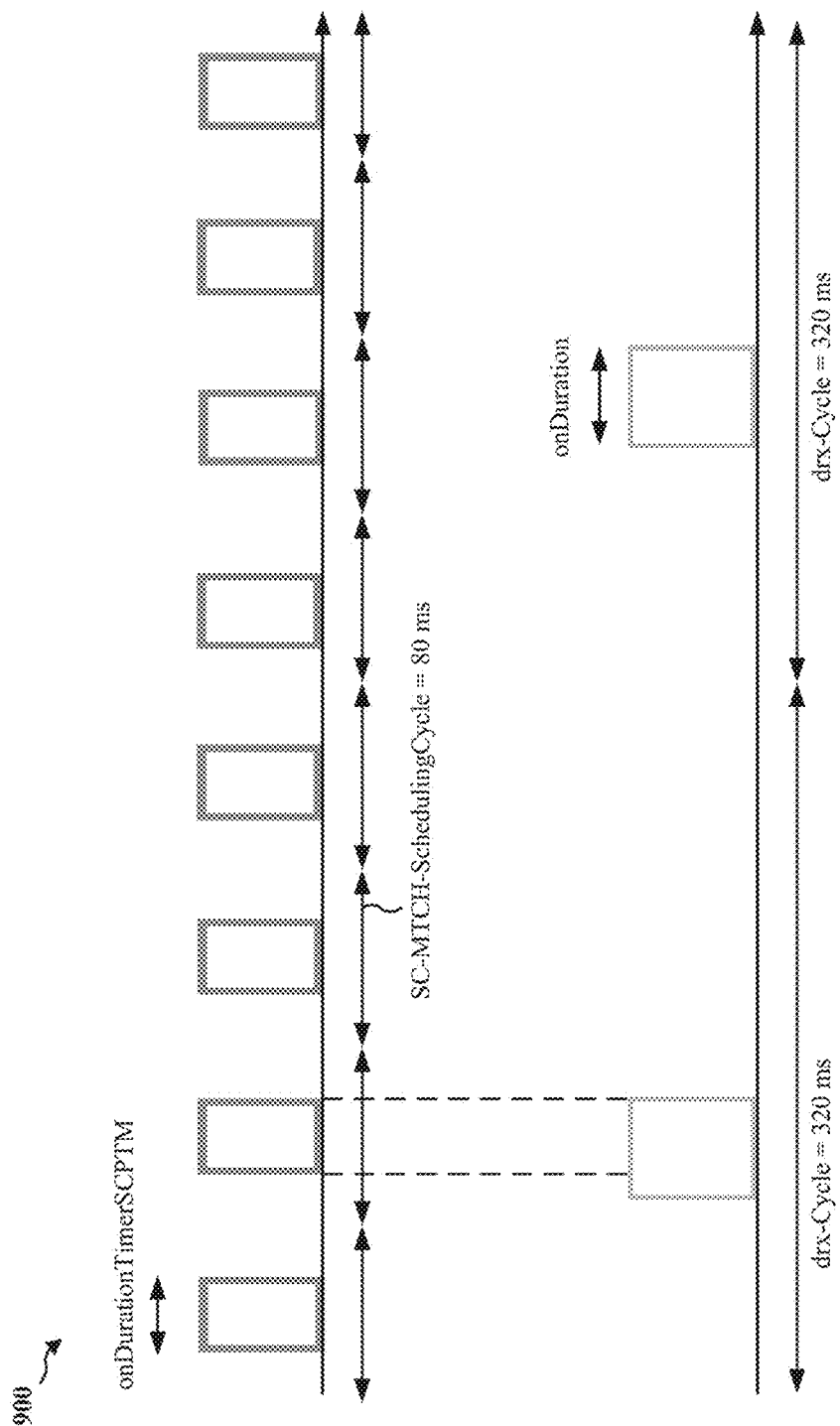

FIG. 9 is a diagram illustrating another example 900 of power efficient alignment of CDRX and SC-PTM DRX schedules. FIG. 9 shows another example of configuring, by a base station, a CDRX schedule using an SC-PTM DRX schedule.

As shown in FIG. 9, an example SC-PTM DRX schedule may have an SC-PTM DRX cycle length of 80 ms (e.g., as shown by SC-MTCH-SchedulingCycle). As further shown, in some aspects, the base station may configure a CDRX cycle length of the CDRX schedule to be an integer multiple of the SC-PTM DRX cycle length of the SC-PTM DRX schedule. For example, the base station may set the CDRX cycle length equal to 320 ms (e.g., as shown by drx-Cycle). In some aspects, the base station may configure the CDRX cycle length as follows:

CDRX Cycle Length=$N \times$SCPTM DRX Cycle Length, where $N \geq 2$

In the case where the CDRX cycle length is longer than the SC-PTM DRX cycle length, the base station may configure the CDRX offset based at least in part on the SC-PTM DRX offset and the SC-PTM DRX cycle length. For example, the base station may configured the CDRX offset as follows:

CDRX Offset=SCPTM DRX Offset+$k \times$SCPTM Cycle Length, where $0 \leq k \leq N-1$ By configuring the CDRX cycle length using the SC-PTM cycle length, and/or by configuring the CDRX offset using the SC-PTM offset and the SC-PTM cycle length, the base station configures at least one CDRX on duration to be time-aligned with at least one SC-PTM on duration. For example, as shown in FIG. 9, the base station may configure a CDRX on duration to at least partially coincide with an SC-PTM DRX on duration. In this case, a portion of the CDRX on duration occurs during the SC-PTM on duration. This reduces a length of time that the UE is in an active state as compared to non-coinciding CDRX and SC-PTM DRX active states, thereby conserving battery power.

Although not shown, in some aspects, the base station may configure the CDRX on duration to be contiguous with the SC-PTM DRX on duration, or may configure the CDRX on duration to occur within a threshold time period of the SC-PTM DRX on duration, as described above in connection with FIG. 8. Additionally, or alternatively, the base station may configure a CDRX on duration timer to match an SC-PTM DRX on duration timer. Additionally, or alternatively, the base station may configure a CDRX inactivity timer to match an SC-PTM DRX inactivity timer. In this way, the base station may configure the CDRX schedule to conserve battery power of the UE.

As indicated above, FIG. 9 is provided as an example. Other examples are possible and may differ from what was described in connection with FIG. 9.

Figure 10:
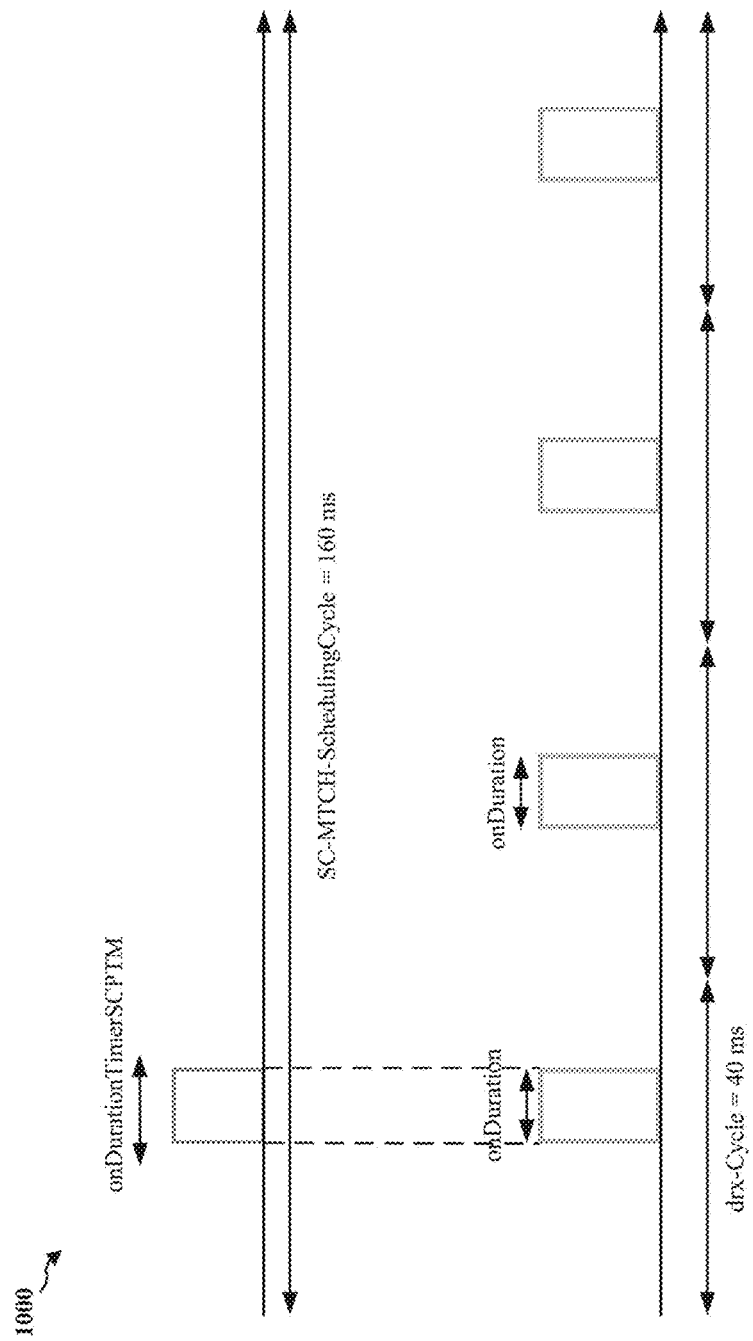

FIG. 10 is a diagram illustrating another example 1000 of power efficient alignment of CDRX and SC-PTM DRX schedules. FIG. 10 shows another example of configuring, by a base station, a CDRX schedule using an SC-PTM DRX schedule.

As shown in FIG. 10, an example SC-PTM DRX schedule may have an SC-PTM DRX cycle length of 160 ms (e.g., as shown by SC-MTCH-SchedulingCycle). As further shown, in some aspects, the base station may configure a CDRX cycle length of the CDRX schedule to be an integer divisor of the SC-PTM DRX cycle length of the SC-PTM DRX schedule. For example, the base station may set the CDRX cycle length equal to 40 ms (e.g., as shown by drx-Cycle). In some aspects, the base station may configure the CDRX cycle length as follows:

$$CDRX \text{ Cycle Length} = \frac{1}{N} \times SCPTM \text{ DRX Cycle Length},$$

where $N \geq 2$

In the case where the CDRX cycle length is shorter than the SC-PTM DRX cycle length, the base station may configure the CDRX offset based at least in part on the SC-PTM DRX offset and the CDRX cycle length. For example, the base station may configured the CDRX offset as follows:

CDRX Offset=SCPTM DRX Offset mod CDRX Cycle Length

By configuring the CDRX cycle length using the SC-PTM cycle length, and/or by configuring the CDRX offset using the SC-PTM offset and the CDRX cycle length, the base station configures at least one CDRX on duration to be time-aligned with at least one SC-PTM on duration. For example, as shown in FIG. 10, the base station may configure a CDRX on duration and an SC-PTM DRX on duration to completely coincide with one another. For example, the base station may configure a CDRX on duration timer to match an SC-PTM DRX on duration timer. This reduces a length of time that the UE is in an active state as compared to non-coinciding CDRX and SC-PTM DRX on durations, thereby conserving battery power of the UE.

Although not shown, in some aspects, the base station may configure the CDRX on duration to be contiguous with the SC-PTM DRX on duration, or may configure the CDRX on duration to occur within a threshold time period of the SC-PTM DRX on duration, as described above in connection with FIG. 8. Additionally, or alternatively, the base station may configure a CDRX inactivity timer to match an SC-PTM DRX inactivity timer. In this way, the base station may configure the CDRX schedule to conserve battery power of the UE.

As indicated above, FIG. 10 is provided as an example. Other examples are possible and may differ from what was described in connection with FIG. 10.

Figure 11:
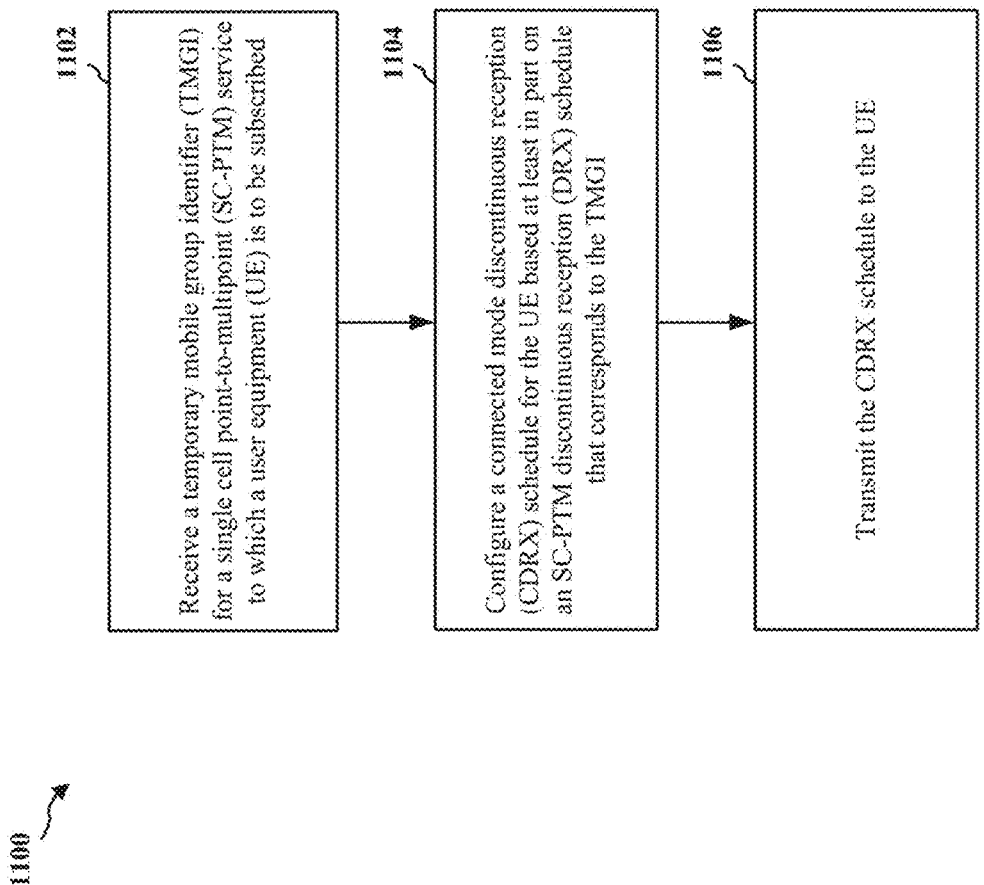
FIG. 11 is a flow chart of a method of wireless communication.

FIG. 11 is a flow chart 1100 of a method of wireless communication. The method may be performed by a base station (e.g., one or more of the eNBs 106, 108 of FIG. 1, the eNBs 204, 208 of FIG. 2, the eNB 610 of FIG. 6, and/or the apparatus 1302/1302').

At 1102, the base station may receive a TMGI for an SC-PTM service to which a UE is to be subscribed. In some aspects, the base station may receive the TMGI in an MII message. In some aspects, the base station may receive the MII message after an initial CDRX schedule configuration, and may reconfigure a CDRX schedule after the initial CDRX schedule configuration, as described below. In some aspects, the base station may receive the MII message prior to an initial CDRX schedule configuration, and may configure the CDRX schedule as part of the initial CDRX schedule configuration, as described below.

At 1104, the base station may configure a CDRX schedule for the UE based at least in part on an SC-PTM DRX schedule that corresponds to the TMGI. In some aspects, the base station may perform a lookup to identify an SC-PTM DRX schedule that corresponds to the TMGI received from the UE, and may configure a CDRX schedule for the UE using the SC-PTM DRX schedule. In some aspects, the base station may configure a CDRX cycle length of the CDRX schedule to match an SC-PTM DRX cycle length of the SC-PTM DRX schedule. In some aspects, the base station may configure a CDRX cycle length of the CDRX schedule to be an integer multiple or an integer divisor of an SC-PTM DRX cycle length of the SC-PTM DRX schedule. Additionally, or alternatively, the base station may configure a CDRX offset of the CDRX schedule to match an SC-PTM DRX offset of the SC-PTM DRX schedule.

In some aspects, the base station may configure at least one CDRX on duration of the CDRX schedule to be time-aligned with at least one SC-PTM DRX on duration of the SC-PTM DRX schedule. For example, the base station may configure at least one CDRX on duration to completely coincide with at least one SC-PTM DRX on duration.

Additionally, or alternatively, the base station may configure at least one CDRX on duration to partially coincide with at least one SC-PTM DRX on duration. Additionally, or alternatively, the base station may configure at least one CDRX on duration to be contiguous with the at least one SC-PTM DRX on duration. Additionally, or alternatively, the base station may configure at least one CDRX on duration to occur within a threshold time period of the at least one SC-PTM DRX on duration.

In some aspects, the base station may configure a CDRX on duration timer of the CDRX schedule to match an SC-PTM DRX on duration timer of the SC-PTM DRX schedule. Additionally, or alternatively, the base station may configure a CDRX inactivity timer of the CDRX schedule to match an SC-PTM DRX inactivity timer of the SC-PTM DRX schedule.

In some aspects, the base station may reconfigure the CDRX schedule after an initial CDRX schedule configuration (e.g., when the MII message is received after the initial CDRX schedule configuration). In some aspects, the base station may configure the CDRX schedule as part of an initial CDRX schedule configuration (e.g., when the MII message is received prior to the initial CDRX schedule configuration).

At 1106, the base station may transmit the CDRX schedule to the UE. For example, the base station may transmit the CDRX schedule to the UE in an RRC configuration message or an RRC reconfiguration message. The UE may use CDRX schedule to configure CDRX for the UE, thereby conserving battery power and/or other resources of the UE due to time-alignment of the CDRX schedule and the SC-PTM DRX schedule.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
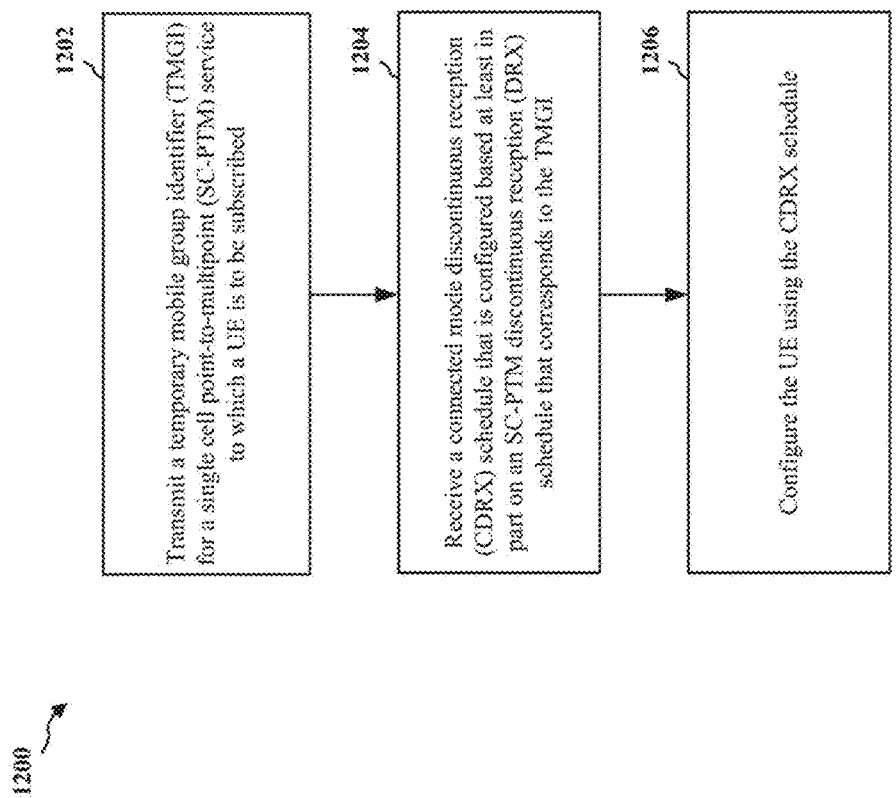
FIG. 12 is a flow chart of another method of wireless communication.

FIG. 12 is a flow chart 1200 of a method of wireless communication. The method may be performed by a UE (e.g., one or more of the UE 102 of FIG. 1, the UE 206 of FIG. 2, the UE 650 of FIG. 6, and/or the apparatus 1502/1502').

At 1202, the UE may transmit a TMGI for an SC-PTM service to which the UE is to be subscribed. For example, the UE may transmit the TMGI to a base station using an MII message.

At 1204, the UE may receive a CDRX schedule that is configured based at least in part on an SC-PTM DRX schedule that corresponds to the TMGI. For example, the UE may transmit the TMGI to the base station. The base station may identify an SC-PTM DRX schedule that corresponds to the TMGI, and may configure a CDRX schedule using the SC-PTM DRX schedule. The base station may transmit the CDRX schedule to the UE, and the UE may receive the CDRX schedule from the base station.

In some aspects, a CDRX cycle length of the CDRX schedule is configured to match an SC-PTM DRX cycle length of the SC-PTM DRX schedule. In some aspects, a CDRX cycle length of the CDRX schedule is configured to be an integer multiple or an integer divisor of an SC-PTM DRX cycle length of the SC-PTM DRX schedule. In some aspects, a CDRX offset of the CDRX schedule is configured to match an SC-PTM DRX offset of the SC-PTM DRX schedule.

In some aspects, at least one CDRX on duration of the CDRX schedule is configured to be time-aligned with at least one SC-PTM DRX on duration of the SC-PTM DRX schedule. In some aspects, the at least one CDRX on duration is configured to completely coincide with the at least one SC-PTM DRX on duration. In some aspects, the at least one CDRX on duration is configured to partially coincide with the at least one SC-PTM DRX on duration. In some aspects, the at least one CDRX on duration is configured to be contiguous with the at least one SC-PTM DRX on duration. In some aspects, the at least one CDRX on duration is configured to occur within a threshold time period of the at least one SC-PTM DRX on duration.

In some aspects, a CDRX on duration timer of the CDRX schedule is configured to match an SC-PTM DRX on duration timer of the SC-PTM DRX schedule. In some aspects, a CDRX inactivity timer of the CDRX schedule is configured to match an SC-PTM DRX inactivity timer of the SC-PTM DRX schedule.

At 1206, the UE may configure the UE using the CDRX schedule. In some aspects, the UE may use the CDRX schedule to initially configure CDRX for the UE. In some aspects, the UE may use the CDRX schedule to reconfigure CDRX for the UE after initially configuring CDRX for the UE. Because the CDRX schedule is configured to be time-aligned with the SC-PTM DRX schedule, the UE conserves battery power and/or other resources.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
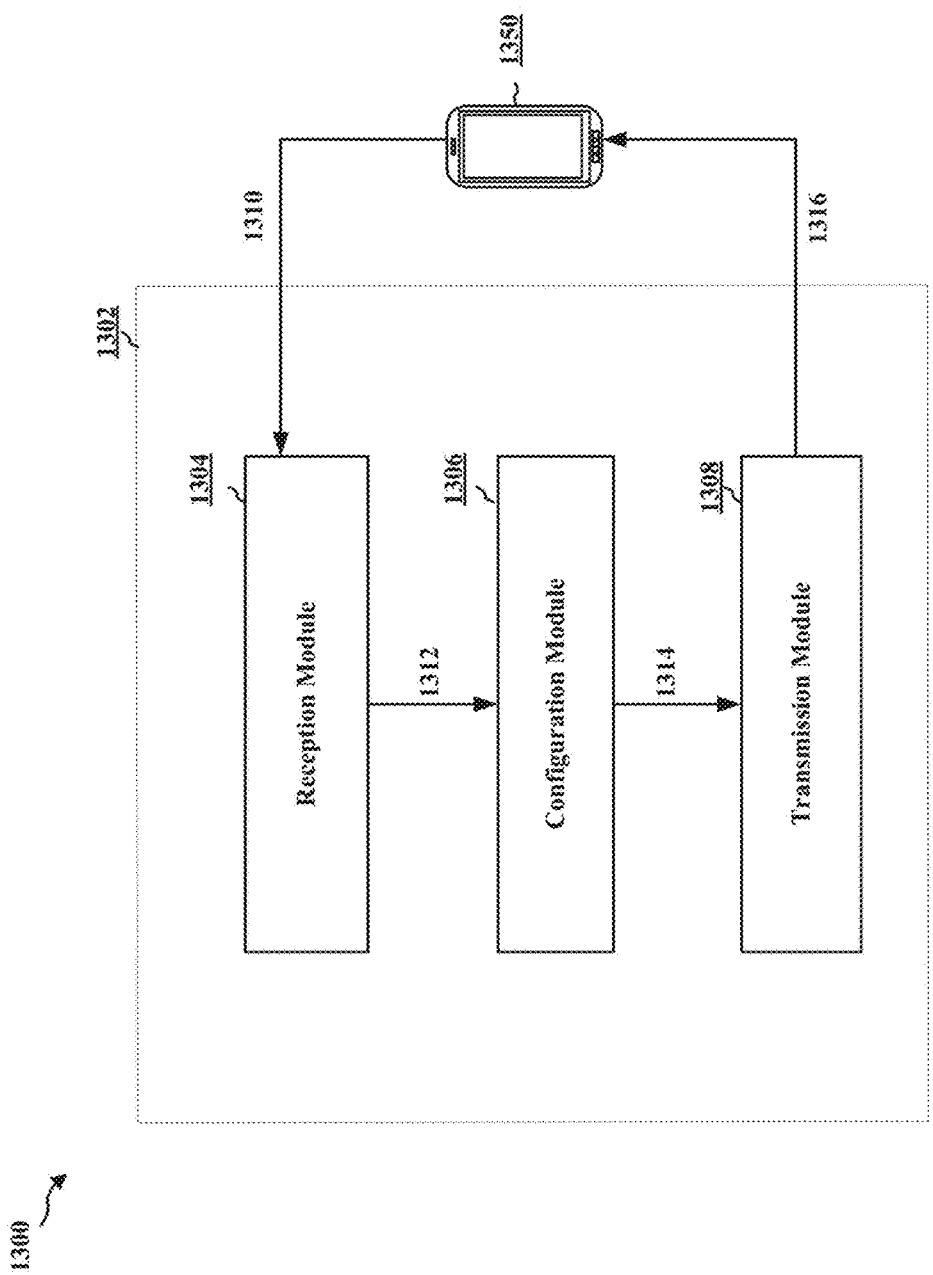
FIG. 13 is a conceptual data flow diagram illustrating the data flow between different modules/means/components in an example apparatus.

FIG. 13 is a conceptual data flow diagram 1300 illustrating the data flow between different modules/means/components in an example apparatus 1302. The apparatus 1302 may be a base station (e.g., one or more of the eNBs 106, 108 of FIG. 1, the eNBs 204, 208 of FIG. 2, and/or the eNB 610 of FIG. 6). In some aspects, the apparatus 1302 may include a reception module 1304, a configuration module 1306, and/or a transmission module 1308.

The reception module 1304 may receive data 1310 from a UE 1350. For example, the data 1310 may include an MII message that includes a TMGI. The reception module 1304 may transmit the TMGI, as data 1312, to the configuration module 1306. The configuration module 1306 may use the data 1312 to identify an SC-PTM DRX schedule that corresponds to the TMGI, and to configure a CDRX schedule for the UE 1350 based at least in part on the SC-PTM DRX schedule. The configuration module may transmit the SC-PTM DRX schedule and/or the CDRX schedule, as data 1314, to the transmission module 1308. The transmission module 1308 may transmit the SC-PTM DRX schedule and/or the CDRX schedule, as data 1316, to the UE 1350, which may be configured using the SC-PTM DRX schedule and/or the CDRX schedule.

The apparatus 1302 may include additional modules that perform each of the blocks of the algorithm in the aforementioned flow charts of FIG. 11. As such, each block in the aforementioned flow charts of FIG. 11 may be performed by a module, and the apparatus 1302 may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
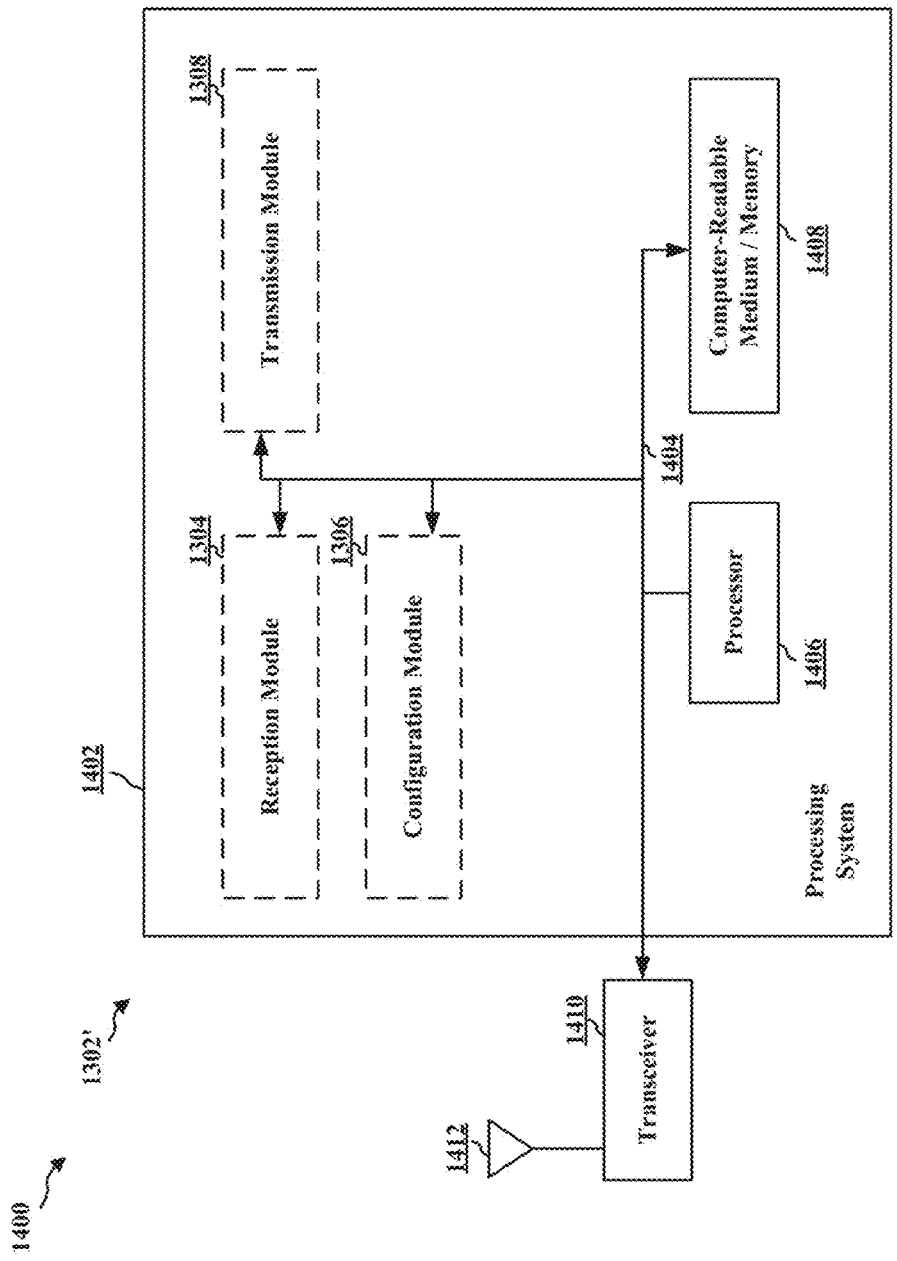
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a base station (e.g., one or more of the eNBs 106, 108 of FIG. 1, the eNBs 204, 208 of FIG. 2, the eNB 610 of FIG. 6).

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, and the computer-readable medium/memory 1408. The bus 1404 may also link various other circuits, such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission module 1308, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described supra for any particular apparatus. The computer-readable medium/memory 1408 may also be used for storing data that is manipulated by the processor 1406 when executing software. The processing system further includes at least one of the modules 1304, 1306, and/or 1308. The modules may be software modules running in the processor 1406, resident/stored in the computer readable medium/memory 1408, one or more hardware modules coupled to the processor 1406, or some combination thereof. The processing system 1402 may be a component of the eNB 610 and may include the memory 676 and/or at least one of the TX processor 616, the RX processor 670, and/or the controller/processor 675.

In some aspects, the apparatus 1302/1302' for wireless communication includes means for receiving a TMGI for an SC-PTM service to which a UE is to be subscribed, means for configuring a CDRX schedule for the UE based at least in part on an SC-PTM DRX schedule that corresponds to the TMGI, and/or means for transmitting the CDRX schedule to the UE. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX processor 616, the RX processor 670, and the controller/processor 675. As such, in one configuration, the aforementioned means may be the TX processor 616, the RX processor 670, and the controller/processor 675 configured to perform the functions recited by the aforementioned means.

FIG. 14 is provided as an example. Other examples are possible and may differ from what was described in connection with FIG. 14.

Figure 15:
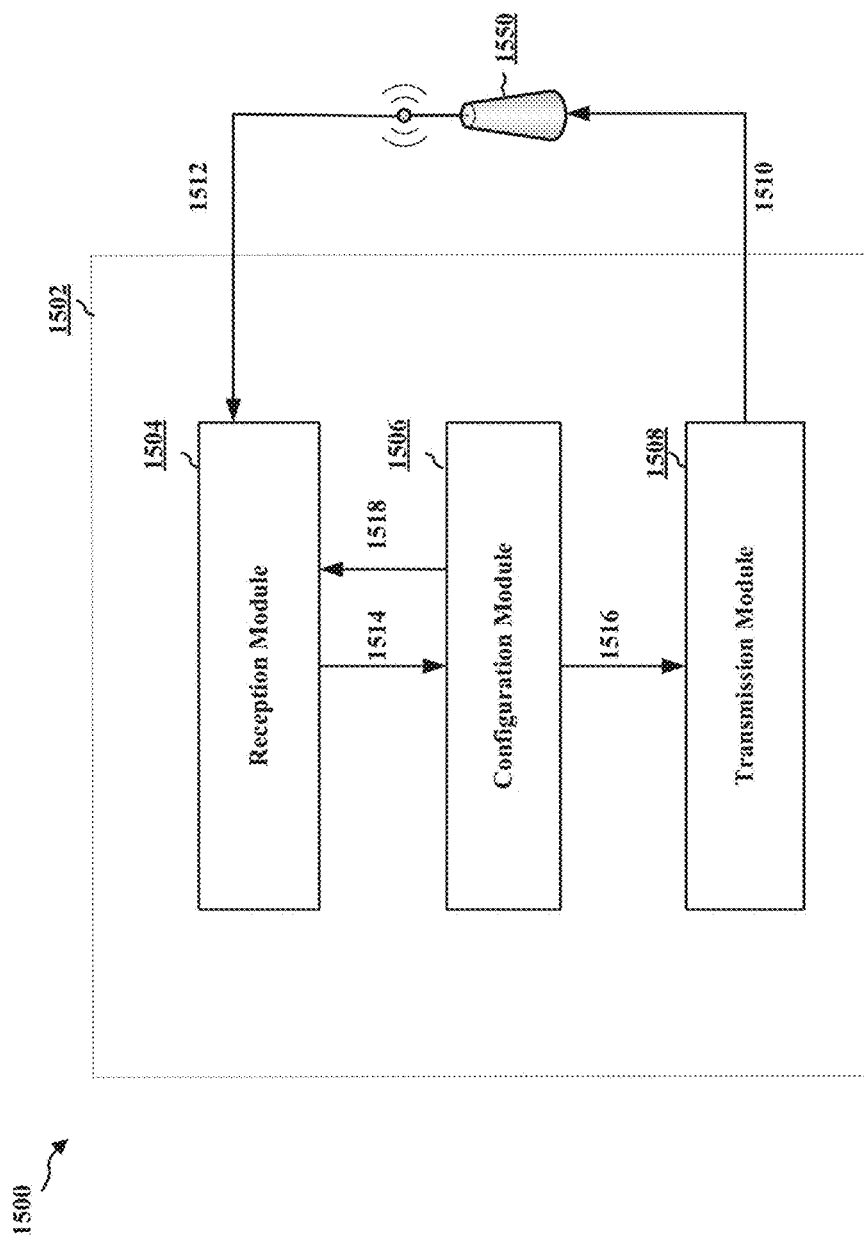
FIG. 15 is a conceptual data flow diagram illustrating the data flow between different modules/means/components in another example apparatus.

FIG. 15 is a conceptual data flow diagram 1500 illustrating the data flow between different modules/means/components in an example apparatus 1502. The apparatus 1502 may be a UE (e.g., one or more of the UE 102 of FIG. 1, the UE 206 of FIG. 2, and/or the UE 650 of FIG. 6). In some aspects, the apparatus 1502 includes a reception module 1504, a configuration module 1506, and/or a transmission module 1508.

The transmission module 1508 may transmit data 1510 to a base station 1550. For example, the data 1510 may include an MII message that includes a TMGI. The base station 1550 may use the TMGI to identify an SC-PTM DRX schedule, and may use the SC-PTM DRX schedule to configure a CDRX schedule for the apparatus 1502. The reception module 1504 may receive the SC-PTM DRX schedule and/or the DRX schedule from the base station 1550 as data 1512. The reception module may transmit the SC-PTM DRX schedule and/or the DRX schedule to the configuration module 1506 as data 1514. The configuration module 1506 may use the data 1514 to configure the apparatus 1502 (e.g., to configure CDRX and/or SC-PTM DRX). In some aspects, the configuration module 1506 may provide data 1516 to transmission module 1508 to configure the transmission module 1508 for CDRX and/or SC-PTM DRX (e.g., to configure the transmission module 1508 to wake up or go to sleep based at least in part on the CDRX schedule and/or the SC-PTM DRX schedule). Additionally, or alternatively, the configuration module 1506 may provide data 1518 to reception module 1504 to configure the reception module 1504 for CDRX and/or SC-PTM DRX (e.g., to configure the reception module 1504 to wake up or go to sleep based at least in part on the CDRX schedule and/or the SC-PTM DRX schedule).

The apparatus 1502 may include additional modules that perform each of the blocks of the algorithm in the aforementioned flow charts of FIG. 12. As such, each block in the aforementioned flow charts of FIG. 12 may be performed by a module, and the apparatus 1502 may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 15 are provided as an example. In practice, there may be additional modules, fewer modules, different modules, or differently arranged modules than those shown in FIG. 15. Furthermore, two or more modules shown in FIG. 15 may be implemented within a single module, or a single module shown in FIG. 15 may be implemented as multiple, distributed modules. Additionally, or alternatively, a set of modules (e.g., one or more modules) shown in FIG. 15 may perform one or more functions described as being performed by another set of modules shown in FIG. 15.

Figure 16:
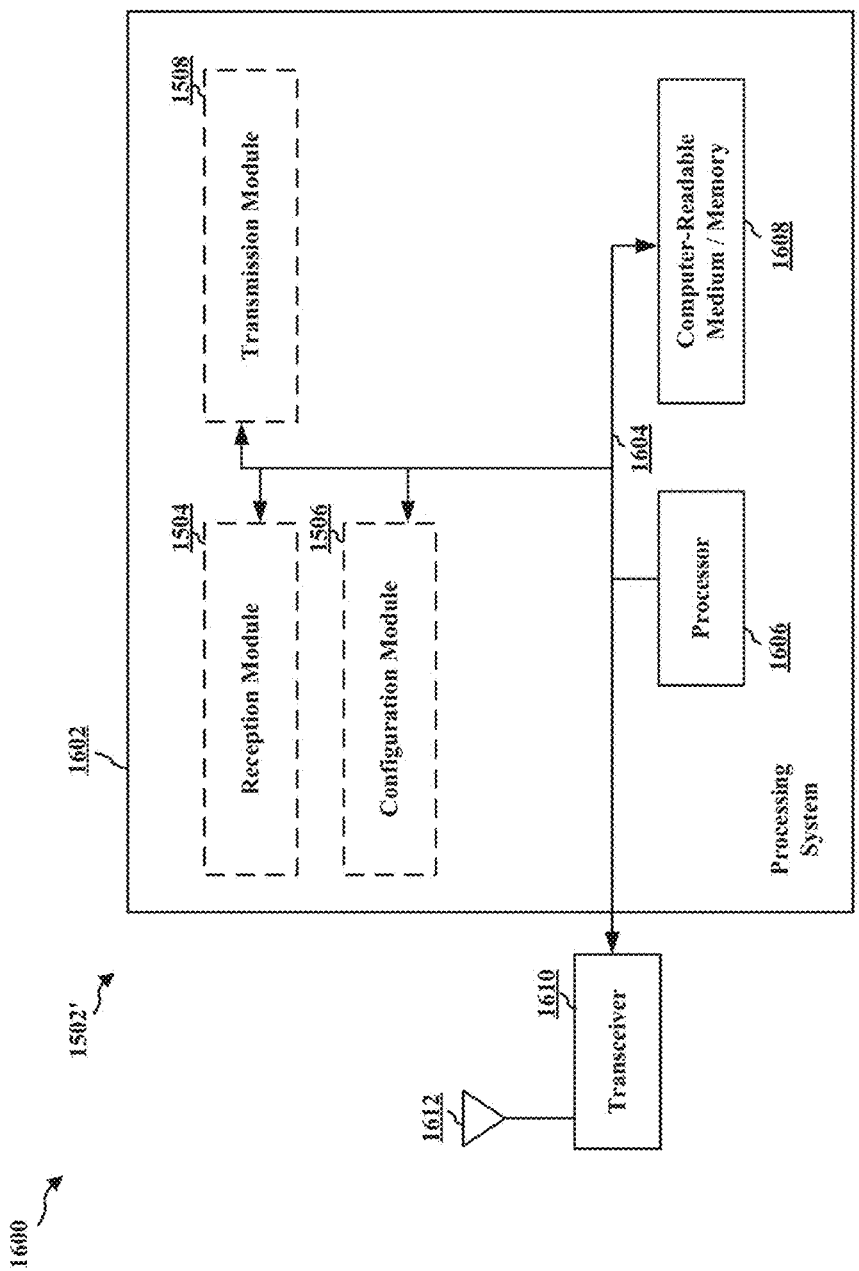
FIG. 16 is a diagram illustrating an example of a hardware implementation for another apparatus employing a processing system.

FIG. 16 is a diagram 1600 illustrating an example of a hardware implementation for an apparatus 1502' employing a processing system 1602. The apparatus 1502' may be a UE (e.g., one or more of the UE 102 of FIG. 1, the UE 206 of FIG. 2, and/or the UE 650 of FIG. 6).

The processing system 1602 may be implemented with a bus architecture, represented generally by the bus 1604. The bus 1604 may include any number of interconnecting buses and bridges depending on the specific application of the processing system 1602 and the overall design constraints. The bus 1604 links together various circuits including one or more processors and/or hardware modules, represented by the processor 1606, the modules 1504, 1506, 1508, and the computer-readable medium/memory 1608. The bus 1604 may also link various other circuits, such as timing sources, peripherals, voltage regulators, and power management circuits, which are well known in the art, and therefore, will not be described any further.

The processing system 1602 may be coupled to a transceiver 1610. The transceiver 1610 is coupled to one or more antennas 1612. The transceiver 1610 provides a means for communicating with various other apparatus over a transmission medium. The transceiver 1610 receives a signal from the one or more antennas 1612, extracts information from the received signal, and provides the extracted information to the processing system 1602, specifically the reception module 1504. In addition, the transceiver 1610 receives information from the processing system 1602, specifically the transmission module 1508, and based at least in part on the received information, generates a signal to be applied to the one or more antennas 1612. The processing system 1602 includes a processor 1606 coupled to a computer-readable medium/memory 1608. The processor 1606 is responsible for general processing, including the execution of software stored on the computer-readable medium/memory 1608. The software, when executed by the processor 1606, causes the processing system 1602 to perform the various functions described supra for any particular apparatus. The computer-readable medium/memory 1608 may also be used for storing data that is manipulated by the processor 1606 when executing software. The processing system further includes at least one of the modules 1504, 1506, and/or 1508. The modules may be software modules running in the processor 1606, resident/stored in the computer readable medium/memory 1608, one or more hardware modules coupled to the processor 1606, or some combination thereof. The processing system 1602 may be a component of the UE 650 and may include the memory 660 and/or at least one of the TX processor 668, the RX processor 656, and/or the controller/processor 659.

In some aspects, the apparatus 1502/1502' for wireless communication includes means for transmitting a TMGI for an SC-PTM service to which the apparatus 1502 is to be subscribed, means for receiving a CDRX schedule that is configured based at least in part on an SC-PTM DRX schedule that corresponds to the TMGI, and/or means for configuring the UE using the CDRX schedule. The aforementioned means may be one or more of the aforementioned modules of the apparatus 1502 and/or the processing system 1602 of the apparatus 1502' configured to perform the functions recited by the aforementioned means. As described supra, the processing system 1602 may include the TX processor 668, the RX processor 656, and/or the controller/processor 659. As such, in one configuration, the aforementioned means may be the TX processor 668, the RX processor 656, and/or the controller/processor 659 configured to perform the functions recited by the aforementioned means.

FIG. 16 is provided as an example. Other examples are possible and may differ from what was described in connection with FIG. 16.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving, by a base station, a temporary mobile group identifier (TMGI) for a single cell point-to-multipoint (SC-PTM) service to which a user equipment (UE) is to be subscribed;
   configuring, by the base station, a connected mode discontinuous reception (CDRX) schedule for the UE based on an SC-PTM discontinuous reception (DRX) schedule that corresponds to the TMGI,
      wherein at least one CDRX on duration of the CDRX schedule is configured to be time-aligned with at least one SC-PTM DRX on duration of the SC-PTM DRX schedule, and
      wherein the at least one CDRX on duration is configured to occur within a threshold time period of the at least one SC-PTM DRX on duration; and transmitting, by the base station, the CDRX schedule to the UE.

2. The method of claim 1, wherein a CDRX cycle length of the CDRX schedule is configured to match an SC-PTM DRX cycle length of the SC-PTM DRX schedule.

3. The method of claim 1, wherein a CDRX cycle length of the CDRX schedule is configured to be an integer multiple or an integer divisor of an SC-PTM DRX cycle length of the SC-PTM DRX schedule.

4. The method of claim 1, wherein a CDRX offset of the CDRX schedule is configured to match an SC-PTM DRX offset of the SC-PTM DRX schedule.

5. The method of claim 1, wherein the at least one CDRX on duration is configured to completely coincide with the at least one SC-PTM DRX on duration.

6. The method of claim 1, wherein the at least one CDRX on duration is configured to partially coincide with the at least one SC-PTM DRX on duration.

7. The method of claim 1, wherein the at least one CDRX on duration is configured to be contiguous with the at least one SC-PTM DRX on duration.

8. The method of claim 1, wherein a CDRX on duration timer of the CDRX schedule is configured to match an SC-PTM DRX on duration timer of the SC-PTM DRX schedule.

9. The method of claim 1, wherein a CDRX inactivity timer of the CDRX schedule is configured to match an SC-PTM DRX inactivity timer of the SC-PTM DRX schedule.

10. The method of claim 1, wherein the TMGI is received in a multimedia broadcast multicast service (MBMS) interest indication (MII) message.

11. The method of claim 10, wherein the MII message is received after an initial CDRX schedule configuration, and
wherein the CDRX schedule is reconfigured after the initial CDRX schedule configuration.

12. The method of claim 10, wherein the MII message is received prior to an initial CDRX schedule configuration, and
wherein the CDRX schedule is configured as part of the initial CDRX schedule configuration.

13. A method of wireless communication, comprising:
transmitting, by a user equipment (UE), a temporary mobile group identifier (TMGI) for a single cell point-to-multipoint (SC-PTM) service to which the UE is to be subscribed;
receiving, by the UE, a connected mode discontinuous reception (CDRX) schedule that is configured based on an SC-PTM discontinuous reception (DRX) schedule that corresponds to the TMGI,
wherein at least one CDRX on duration of the CDRX schedule is configured to be time-aligned with at least one SC-PTM DRX on duration of the SC-PTM DRX schedule, and
wherein the at least one CDRX on duration is configured to occur within a threshold time period of the at least one SC-PTM DRX on duration; and
configuring the UE using the CDRX schedule.

14. The method of claim 13, wherein a CDRX cycle length of the CDRX schedule is configured based on an SC-PTM DRX cycle length of the SC-PTM DRX schedule.

15. The method of claim 13, wherein a CDRX offset of the CDRX schedule is configured based on an SC-PTM DRX offset of the SC-PTM DRX schedule.

16. A base station for wireless communication, comprising:
a memory; and
at least one processor coupled to the memory and configured to:
receive a temporary mobile group identifier (TMGI) for a single cell point-to-multipoint (SC-PTM) service to which a user equipment (UE) is to be subscribed;
configure a connected mode discontinuous reception (CDRX) schedule for the UE based on an SC-PTM discontinuous reception (DRX) schedule that corresponds to the TMGI,
wherein at least one CDRX on duration of the CDRX schedule is configured to be time-aligned with at least one SC-PTM DRX on duration of the SC-PTM DRX schedule, and
wherein the at least one CDRX on duration is configured to occur within a threshold time period of the at least one SC-PTM DRX on duration; and
transmit the CDRX schedule to the UE.

17. The base station of claim 16, wherein a CDRX cycle length of the CDRX schedule is configured to match an SC-PTM DRX cycle length of the SC-PTM DRX schedule.

18. The base station of claim 16, wherein a CDRX cycle length of the CDRX schedule is configured to be an integer multiple or an integer divisor of an SC-PTM DRX cycle length of the SC-PTM DRX schedule.

19. The base station of claim 16, wherein a CDRX offset of the CDRX schedule is configured to match an SC-PTM DRX offset of the SC-PTM DRX schedule.

20. The base station of claim 16, wherein the at least one CDRX on duration is configured to completely coincide with the at least one SC-PTM DRX on duration.

21. The base station of claim 16, wherein the at least one CDRX on duration is configured to partially coincide with the at least one SC-PTM DRX on duration.

22. The base station claim 16, wherein the at least one CDRX on duration is configured to be contiguous with the at least one SC-PTM DRX on duration.

23. The base station of claim 16, wherein the TMGI is received in a multimedia broadcast multicast service (MBMS) interest indication (MII) message.

24. A user equipment (UE) for wireless communication, comprising:
a memory; and
at least one processor coupled to the memory and configured to:
transmit a temporary mobile group identifier (TMGI) for a single cell point-to-multipoint (SC-PTM) service to which the UE is to be subscribed;
receive a connected mode discontinuous reception (CDRX) schedule that is configured based on an SC-PTM discontinuous reception (DRX) schedule that corresponds to the TMGI,
wherein at least one CDRX on duration of the CDRX schedule is configured to be time-aligned with at least one SC-PTM DRX on duration of the SC-PTM DRX schedule, and
wherein the at least one CDRX on duration is configured to occur within a threshold time period of the at least one SC-PTM DRX on duration; and
configure the UE using the CDRX schedule.

25. The base station of claim 23, wherein the MII message is received after an initial CDRX schedule configuration, and
wherein the CDRX schedule is reconfigured after the initial CDRX schedule configuration.

26. The base station of claim 23, wherein the MII message is received prior to an initial CDRX schedule configuration, and wherein the CDRX schedule is configured as part of the initial CDRX schedule configuration.

27. The base station of claim 16, wherein a CDRX on duration timer of the CDRX schedule is configured to match an SC-PTM DRX on duration timer of the SC-PTM DRX schedule.

28. The base station of claim 16, wherein a CDRX inactivity timer of the CDRX schedule is configured to match an SC-PTM DRX inactivity timer of the SC-PTM DRX schedule.

29. The UE of claim 24, wherein a CDRX cycle length of the CDRX schedule is configured based on an SC-PTM DRX cycle length of the SC-PTM DRX schedule.

30. The UE of claim 24, wherein a CDRX offset of the CDRX schedule is configured based on an SC-PTM DRX offset of the SC-PTM DRX schedule.

* * * * *